(12) United States Patent
Wu et al.

(10) Patent No.: US 11,855,754 B2
(45) Date of Patent: Dec. 26, 2023

(54) SUBCARRIER MODULATION WITH RADIO FREQUENCY (RF) IQ MODULATORS

(71) Applicant: Infinera Corporation, Sunnyvale, CA (US)

(72) Inventors: Kuang-Tsan Wu, San Jose, CA (US); Han Henry Sun, Ottawa (CA); Steven Joseph Hand, San Jose, CA (US); David F. Welch, San Jose, CA (US)

(73) Assignee: Infinera Corporation, San Jose, CA (US)

( * ) Notice: Subject to any disclaimer, the term of this patent is extended or adjusted under 35 U.S.C. 154(b) by 0 days.

(21) Appl. No.: 16/730,562

(22) Filed: Dec. 30, 2019

(65) Prior Publication Data

US 2020/0252154 A1 Aug. 6, 2020

Related U.S. Application Data

(60) Provisional application No. 62/799,098, filed on Jan. 31, 2019.

(51) Int. Cl.
*H04J 14/02* (2006.01)
*H04B 10/25* (2013.01)

(52) U.S. Cl.
CPC .............. *H04J 14/02* (2013.01); *H04B 10/25* (2013.01)

(58) Field of Classification Search
CPC ............ H04J 14/02; H04J 14/06; H04B 10/25
See application file for complete search history.

(56) References Cited

U.S. PATENT DOCUMENTS

| 8,768,174 B2 * | 7/2014 | Zeng | H04B 10/548 398/72 |
| 9,124,369 B2 * | 9/2015 | Ji | H04J 14/0298 |
| 2005/0271387 A1 * | 12/2005 | Kee | H04B 10/2543 398/140 |
| 2010/0220376 A1 * | 9/2010 | Kobayashi | G02F 1/0327 359/238 |
| 2012/0106971 A1 * | 5/2012 | Sugaya | H04J 14/0275 398/97 |
| 2013/0071119 A1 * | 3/2013 | Liu | H04B 10/516 398/159 |

(Continued)

*Primary Examiner* — Pranesh K Barua
(74) *Attorney, Agent, or Firm* — David L. Soltz

(57) ABSTRACT

Methods, systems, and apparatus for subcarrier modulation with radio frequency inphase-quadrature (IQ) modulators. A system includes a plurality of IQ modulators, each configured to receive an input electrical signal comprising an inphase signal and a quadrature signal, and each configured to modulate the inphase signal and quadrature signal based on one of a plurality of local oscillator signals to output a multiplexed signal. Each of the plurality of local oscillator signals is supplied by a respective one of a plurality of local oscillator circuits. A modulator circuit is configured to modulate a carrier optical signal from a laser having a frequency $\omega_c$ based on the multiplexed signal to generate a modulated optical signal centered at frequency $\omega_c$ and comprising a plurality of subcarriers. A center frequency of each of the plurality of subcarriers is offset from $\omega_c$ by a frequency of said one of the plurality of local oscillator signals.

12 Claims, 11 Drawing Sheets

(56) References Cited

U.S. PATENT DOCUMENTS

| | | | | |
|---|---|---|---|---|
| 2014/0169793 A1* | 6/2014 | Harley | ................ | H04B 10/616 |
| | | | | 398/79 |
| 2015/0071652 A1* | 3/2015 | Zhuge | ................ | H04B 10/6163 |
| | | | | 398/208 |
| 2015/0093117 A1* | 4/2015 | Rahn | .................... | H04B 10/588 |
| | | | | 398/115 |
| 2016/0191168 A1* | 6/2016 | Huang | ................ | H04B 10/516 |
| | | | | 398/45 |
| 2017/0033885 A1* | 2/2017 | Cavaliere | ................ | H04J 14/06 |
| 2020/0162167 A1* | 5/2020 | Hamaoka | ............. | H04B 10/532 |

* cited by examiner

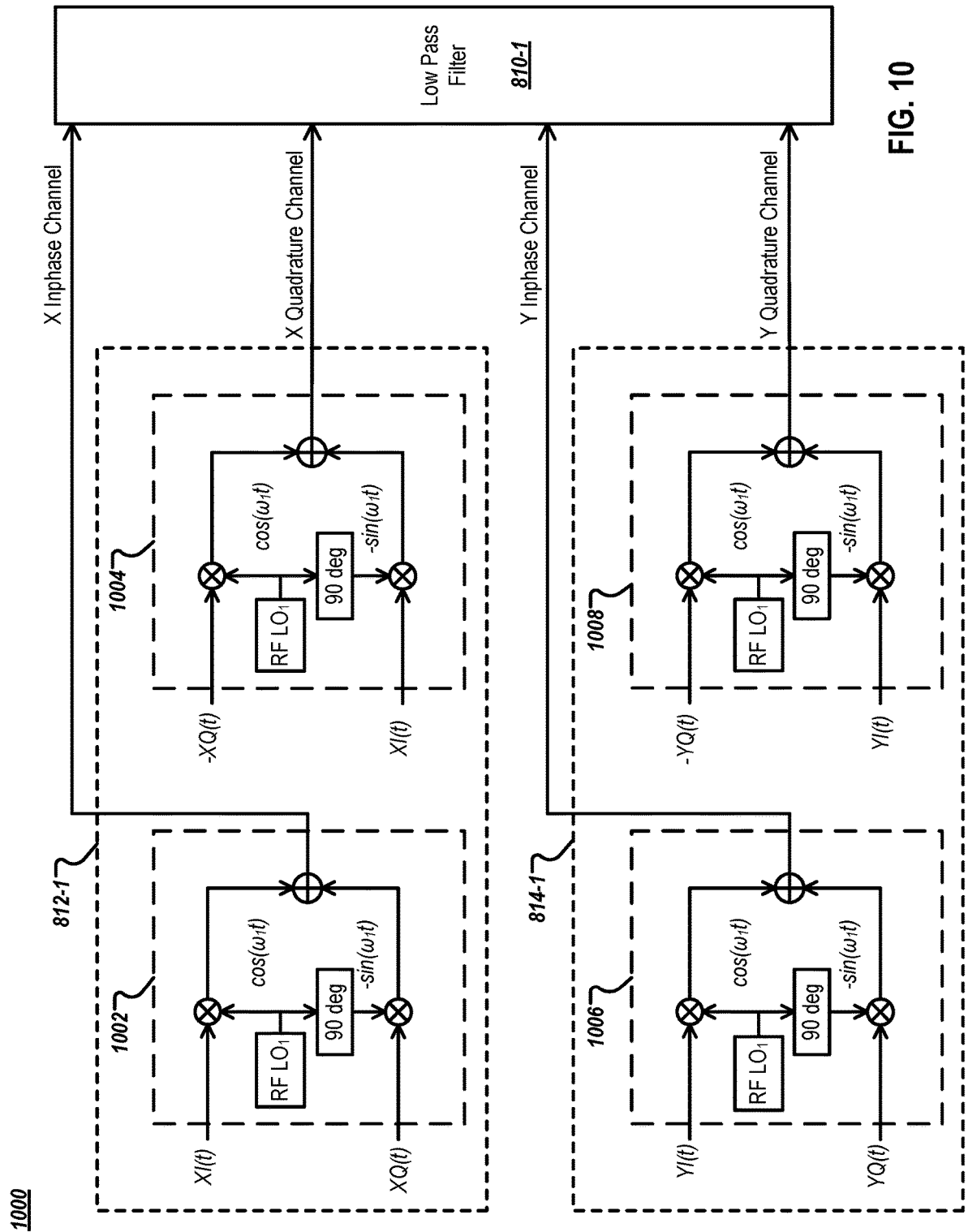

SUBCARRIER MODULATION WITH RADIO FREQUENCY (RF) IQ MODULATORS

CROSS REFERENCE TO RELATED APPLICATIONS

This application claims the benefit of U.S. Provisional Patent Application No. 62/799,098, filed Jan. 31, 2019, which is incorporated herein by reference in its entirety.

BACKGROUND

This specification relates generally to optical communication networks. Optical networks can be used to transmit large amounts of information. The information can be transmitted in the form of optical signals traveling through optical fibers.

SUMMARY

In optical communication systems, wavelength division multiplex (WDM) systems are systems in which multiple optical signals, each having a different wavelength, can be combined into a single optical communication channel (e.g., an optical fiber) using an optical multiplexer circuit (referred to as a "multiplexer"). These optical communication systems can include a transmitter with a laser system. The laser system can provide a laser signal associated with each wavelength to a modulator configured to modulate the output of the laser. Additionally, the transmitter can include a multiplexer to combine each of the modulated outputs (e.g., to form a combined output or WDM signal)

Consistent with the present disclosure, a coherent modem, such as a 100 gigabit per second (Gb/s) coherent modem, is provided with radio frequency (RF) or analog mixers to construct subcarriers onto a carrier optical signal from a single laser. The coherent modem can modulate the amplitude and phase of the laser light, and transmit across two polarizations, to transport large amounts of information through a transmission channel. For example, a 100 Gb/s modem transmitting a signal with eight subcarriers may transmit 800 Gb/s.

Accordingly, when subcarriers are modulated onto a carrier optical signal, high performance digital-to-analog converters (DACs) with high bandwidth sampling rates may not be required. For example, if 16 quadrature amplitude modulation (QAM) 16 gigabaud (Gbaud) signals are used for a 100 Gb/s modem, DACs with 20 Gigasamples per second (GS/s) and 10 gigahertz (GHz) bandwidth may be sufficient.

In some implementations, RF inphase/quadrature (IQ) modulators are provided in conjunction with modems to generate the desired subcarriers. The subcarriers can be independently routed through multiple Reconfigurable and Fixed Optical Add/Drop Mux (ROADMs and FOADM) dense wavelength division multiplexing (DWDM) networks.

In some implementations, frequency synthesizers generate analog radio frequency local oscillator signals (RF LOs) using local oscillator (LO) circuits. Each local oscillator circuit can supply a respective RF LO. The RF LOs can provide the desired center frequency of each subcarrier. The center frequency of each subcarrier can be, for example, the center frequency of the carrier optical signal plus the frequency of an RF LO, or the center frequency of the carrier optical signal minus the frequency of an RF LO.

The frequency of the RF LOs can be adjusted to produce a frequency gap between subcarriers. For example, the LO circuits of the frequency synthesizer can tune the RF LO frequencies in order to control the sizes of the gaps between subcarriers. A gap between subcarriers reduces overlap and interference between subcarriers. A gap between subcarriers also may allow the subcarriers to route independently through the optical network. For example, individual subcarriers may be routed through different routers within the optical network, and/or may be routed to different destinations within the optical network.

The transmitter in an optical communication system may support communications over a wide range of wavelength channels. For example, a transmitter may support ten channels, each spaced apart by, for example, 50 GHz to 200 GHz, depending upon the design of the system. The set of channels supported by the transmitters can be referred to as the channel "grid". Channel grids may be aligned to standardized frequencies, such as those published by the Telecommunication Standardization Sector (ITU-T). The set of channels may be referred to as the ITU frequency grid for the transmitters. The spacing between the channels, may be less than 200 GHz, for example, in order to pack the channels together to form a superchannel.

In some implementations, tightly packed subcarriers are modulated for spectrum efficiency. For example, subcarriers may be modulated onto the carrier optical signal with a frequency gap as small as 0 GHz. Tightly packed subcarriers may be routed together through an optical network in a superchannel.

In some implementations, subcarriers are modulated with equal frequency gaps between each subcarrier. For example, the gaps between each subcarrier and the adjacent subcarriers may be $G_x$=6.25 GHz.

In some implementations, subcarriers are modulated with variable frequency gaps between subcarriers. For example, the gap between a first subcarrier and a second subcarrier may be $G_x$=0 GHz, while the gap between the second subcarrier and a third subcarrier may be $G_x$=6.25 GHz.

In some implementations, a carrier signal may include multiple subcarriers. For example, the carrier signal may include four subcarriers, eight subcarriers, or any number N of subcarriers. Each subcarrier requires two IQ modulators: one for an inphase path of a Mach-Zehnder modulator circuit, and one for a quadrature path of the Mach-Zehnder modulator circuit.

In some implementations, a WDM signal may include multiple carrier signals. For example, a WDM signal may include multiple carrier signals adjacent to one another on the frequency spectrum, where each carrier signal may include multiple subcarriers.

In some implementations, multiple subcarriers from different carrier signals may be routed together in a superchannel. For example, the gap between a first carrier signal and a second carrier signal may be $G_x$=0 GHz. Thus, the adjacent subcarriers in the first carrier signal and the second carrier signal may be routed through the optical network in a superchannel.

The described techniques provide a variety of capabilities in order for each subcarrier or groups of subcarriers to pass through multiple ROADM and FOADM DWDM networks, for example. In some examples, DWDM networks may require a minimum frequency gap between subcarriers. For example, a DWDM network may require a minimum frequency gap of 5 GHz or 10 GHz between adjacent subcarriers.

In a general aspect, a system includes a plurality of inphase-quadrature (IQ) modulators. Each IQ modulator is configured to: receive an input electrical signal, the input electrical signal including an inphase signal and a quadrature signal; and modulate the inphase signal and the quadrature signal based on one of a plurality of local oscillator signals to output a multiplexed signal, each of the plurality of local oscillator signals being supplied by a respective one of a plurality of local oscillator circuits. The system includes a modulator circuit configured to modulate a carrier optical signal from a laser having a frequency $\omega_c$ based on the multiplexed signal to generate a modulated optical signal. The modulated optical signal is centered at frequency $\omega_c$. The modulated optical signal includes a plurality of subcarriers. A center frequency of each of the plurality of subcarriers is offset from $\omega_c$ by a frequency of said one of the plurality of local oscillator signals.

In some implementations, the plurality of subcarriers forms a continuous waveform in the frequency domain.

In some implementations, the modulated optical signal further includes a plurality of gaps between subcarriers in the frequency domain.

In some implementations, the frequency width of each of the plurality of gaps is equal.

In some implementations, the frequency width of each of the plurality of gaps is variable.

In some implementations, each of the plurality of gaps separates a group of subcarriers including one or more subcarriers.

In some implementations, each of the one or more subcarriers within each group of subcarriers transmits a same route through the optical network.

In some implementations the system further includes a frequency synthesizer for determining the center frequency of each of the plurality of subcarriers.

In some implementations, the center frequencies of the plurality of subcarriers are symmetrical about $\omega_c$.

In some implementations, a maximum number of subcarriers is defined by a bandwidth of the modulator circuit.

In some implementations, the modulated optical signal has a single polarization.

In some implementations, the modulated optical signal has a dual polarization.

In some implementations, each of the plurality of subcarriers is a Nyquist subcarrier.

In some implementations, each of plurality of subcarriers is modulated in accordance with a modulation format, the modulation format being selected from an m-quadrature amplitude modulation (QAM), m being an integer, quadrature phase shift keying (QPSK), and binary phase shift keying (BPSK).

Implementations of the above techniques include methods, apparatus, systems and computer program products. One such computer program product is suitably embodied in a non-transitory machine-readable medium that stores instructions executable by one or more processors. The instructions are configured to cause the one or more processors to perform the above-described actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 10 is a block diagram that illustrates an example of a system for RF IQ demodulation.

Like reference numbers and designations in the various drawings indicate like elements.

DETAILED DESCRIPTION

Figure 1:
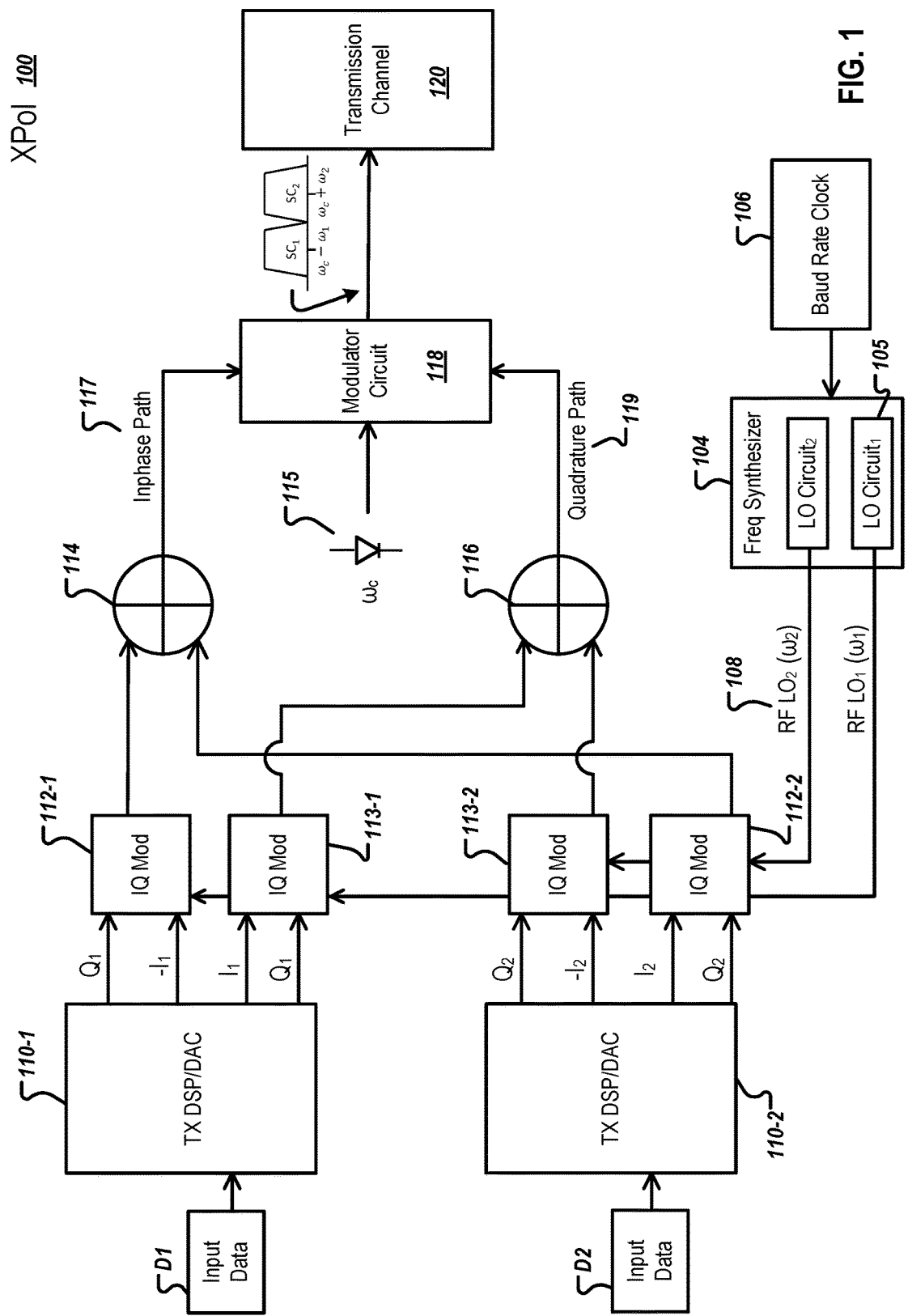
FIG. 1 is a block diagram that illustrates an example of a system for subcarrier modulation using RF IQ modulators.

FIG. 1 is a block diagram that illustrates an example of a system 100 for subcarrier modulation using RF IQ modulators. For simplicity, FIG. 1 illustrates modulation of two subcarriers, where a first subcarrier is generated above a laser frequency, and a second subcarrier is generated below the laser frequency. The system 100 can be extended to generate additional subcarriers, with the maximum number of subcarriers limited by a bandwidth of an electrical-optical path of the system. For example, N number of digital signal processing circuits of a modem can be used to generate N number of subcarriers, with each subcarrier carrying, e.g., 100 gigabits per second (Gb/s). The overall data rate of the modem is therefore N times 100 Gb/s.

The system 100 includes a baud rate clock 106, a frequency synthesizer 104 including LO circuits 105, transmitter (TX) DSP/DACs 110-1 and 110-2 (collectively referred to herein as TX DSP/DACs 110, IQ modulators 112-1; 112-2 and 113-1; 113-2 (collectively referred to herein as IQ modulators 112, 113), an inphase adder 114, a quadrature adder 116, a modulator circuit 118, and a transmission channel 120.

The system 100 includes four example IQ modulators, 112-1, 112-2, 113-1, and 113-2. The operations of the IQ modulators 112-1, 112-2, 113-1, and 113-2 are described below. The operations of the IQ modulators 112-1, 112-2, 113-1, and 113-2 are representative of the operations of additional IQ modulators 112-3 to 112-N and 113-3 to 113-N. Specifically, the operations of IQ modulators 112-1; 113-1 are representative of odd numbered IQ modulators, e.g., 112-3; 113-3, 112-5; 113-5, etc. Similarly, the operations of IQ modulators 112-2; 113-2 are representative of even numbered IQ modulators, e.g., 112-4; 113-4, 112-6; 113-6, etc.

Per polarization, each subcarrier requires two IQ modulators 112, 113, one for an inphase path 117 of the modulator circuit 118, and one for a quadrature path 119 of the modulator circuit 118. The system 100 illustrates subcarrier modulation using IQ modulators for one polarization, e.g., X polarization.

The system 100 can receive the input data D1, D2. The input data D1, D2 can include bit stream or byte stream, for example, which is to be transmitted over the transmission channel 120. In some implementations, the input data D1, D2 provided to each TX DSP/DAC 110 is different from one another. For example, the input data D1 may be a different set of data compared to the input data D2.

The system 100 includes two example input data, D1, D2. The processing of the input data D1, D2 are described below. The processing of the input data D1, D2 are representative of the processing of additional input data D3 to DN. Specifically, the processing of the input data D1 is representative of odd numbered data e.g., D3, D5, etc. Similarly, the processing of the input data D2 is representative of even numbered data e.g., D4, D6, etc.

The TX DSP/DACs 110 receive the input data D1, D2. The TX DSP/DACs 110 produce inphase signals $I_1$, $I_2$, and quadrature signals $Q_1$, $Q_2$. For example, the TX DSP/DAC 110-1 may receive the input data D1, and produce inphase signal $I_1$ and quadrature signal $Q_1$. It is noted that the inphase signals $I_1$, $I_2$ band quadrature signals $Q_1$, $Q_2$ refer to input electrical signals to the IQ modulators 112, 113, while the inphase path 117 and the quadrature path 119 refer to input electrical signals to the modulator circuit 118.

The baud rate is regulated by the baud rate clock 106. The baud rate is a measure of the number of signal elements, or bits, per second that can be transmitted or received. The clock circuit of the baud rate clock controls the timing of the system 100.

The frequency synthesizer 104 is an electronic circuit that generates signals at a range of frequencies from a single reference frequency. The frequency synthesizer includes LO circuits 105, including LO Circuit$_1$ and LO Circuit$_2$. The frequency synthesizer 104 may use the techniques of frequency multiplication, frequency division, direct digital synthesis, frequency mixing, and phase-locked loops to generate its frequencies. The LO Circuits 105 produce analog RF LOs 108. For example, the LO Circuit$_1$ produces RF LO$_1$ at frequency $\omega_1$, the LO Circuit$_2$ produces RF LO$_2$ at frequency $\omega_2$, etc.

The frequency synthesizer 104 provides the baud-rate related analog RF LOs to each IQ modulator 112, 113 to set the center frequency of the subcarriers. In applications where a desired frequency gap between adjacent SCs is needed, the center frequency of each subcarrier can be set by the LO circuits 105 of the frequency synthesizer 104. For example, the center frequency of each subcarrier may be offset from the center frequency of the carrier signal by each of the frequencies $\omega_1$ to $\omega_N$. In this case, the total number of subcarriers will be limited by the total frequency gap, the signal bandwidth of the SCs, and the bandwidth of the modulator circuit 118.

In some implementations, the IQ modulators 112, 113 receive respective data and generate inphase and quadrature signals. The IQ modulators 112, 113 modulate the inphase and quadrature signals based on the LOs 108, and based on a 90-degree shifted version of the LOs. Each IQ modulator 112, 113 requires IQ gain, DC offset, IQ delay and quadrature control. The IQ modulators 112 each output a modulated signal to be fed into the inphase path 117 of the modulator circuit 118, while the IQ modulators 113 each output a modulated signal to be fed into the quadrature path 119 of the modulator circuit 118. The operations of the IQ modulators are discussed in greater detail in reference to FIGS. 2A AND 2B.

In some implementations, the inphase adder 114 and the quadrature adder 116 receive the modulated signals from the IQ modulators 112, 113. For example, the inphase adder 114 receives the modulated signals from the IQ modulators 112-1, 112-2, and the quadrature adder 116 receives the modulated signals from the IQ modulators 113-1, 113-2. The inphase adder 114 combines the modulated signals from the IQ modulators 112-1, 112-2. The quadrature adder 116 combines the modulated signals from the IQ modulators 113-1, 113-2.

The inphase adder 114 and the quadrature adder 116 each output a multiplexed signal to the modulator circuit 118. The inphase adder 114 outputs the multiplexed signal to the inphase path 117 of the modulator circuit 118. The quadrature adder 116 outputs the multiplexed signal to the quadrature path 119 of the modulator circuit 118. The modulator circuit can include one or more Mach-Zehnder modulator (MZMs). The modulator circuit 118 modulates the multiplexed signals from the inphase path 117 and the quadrature path 119 with the laser 115.

The laser 115 has a frequency of $\omega_c$. The laser 115 can be used to provide an output optical light beam, or carrier optical signal, for transmitting a modulated optical signal. The modulator circuit 118 can receive and modulate the optical light beam from the laser 115. The operations of the modulator circuit 118 are discussed in greater detail in reference to FIG. 3.

The modulator circuit 118 produces a modulated optical light beam, which is transmitted as a multiple subcarrier output signal. For example, the modulator circuit 118 can produce a WDM signal with subcarriers $SC_1$, $SC_2$ for transmitting through the transmission channel 120. In some implementations, the transmission channel 120 can be an optical fiber in an optical communication system. In some implementations, the transmission channel 120 may be a dense wavelength division multiplexing (DWDM) optical network with tight tolerance reconfigurable optical add-drop multiplexers (ROADMs).

Although FIG. 1 illustrates the system 100 outputting a single-polarization WDM signal, e.g., X polarization, the system 100 can include additional circuitry in order to produce WDM signals of both X and Y polarizations. For example, the system 100 can include duplicate IQ modulators, where each pair of IQ modulators outputs either an X polarization or Y polarization signal.

In some implementations, the system 100 may produce subcarriers at a desired symbol rate. The desired symbol rate can be based on desired performance characteristics of the system 100 and/or computational complexity of the system 100. For example, the components within the system 100 may produce digital subcarrier samples at a rate of 33 Gbaud. In another example, the system 100 may output two sets of subcarriers (e.g., X polarization signals and Y polarization signals) of 33 Gbaud each. Alternatively, each subcarrier output may include a subset of the total symbol rate, such as 16.5 Gbaud or lower, to give a total of 33 Gbaud. Other symbol rate values are possible, such as 16 Gbaud (or lower), 66 Gbaud, 99 Gbaud, 132 Gbaud, or 198 Gbaud, or higher, to name a few examples.

Figure 2A:
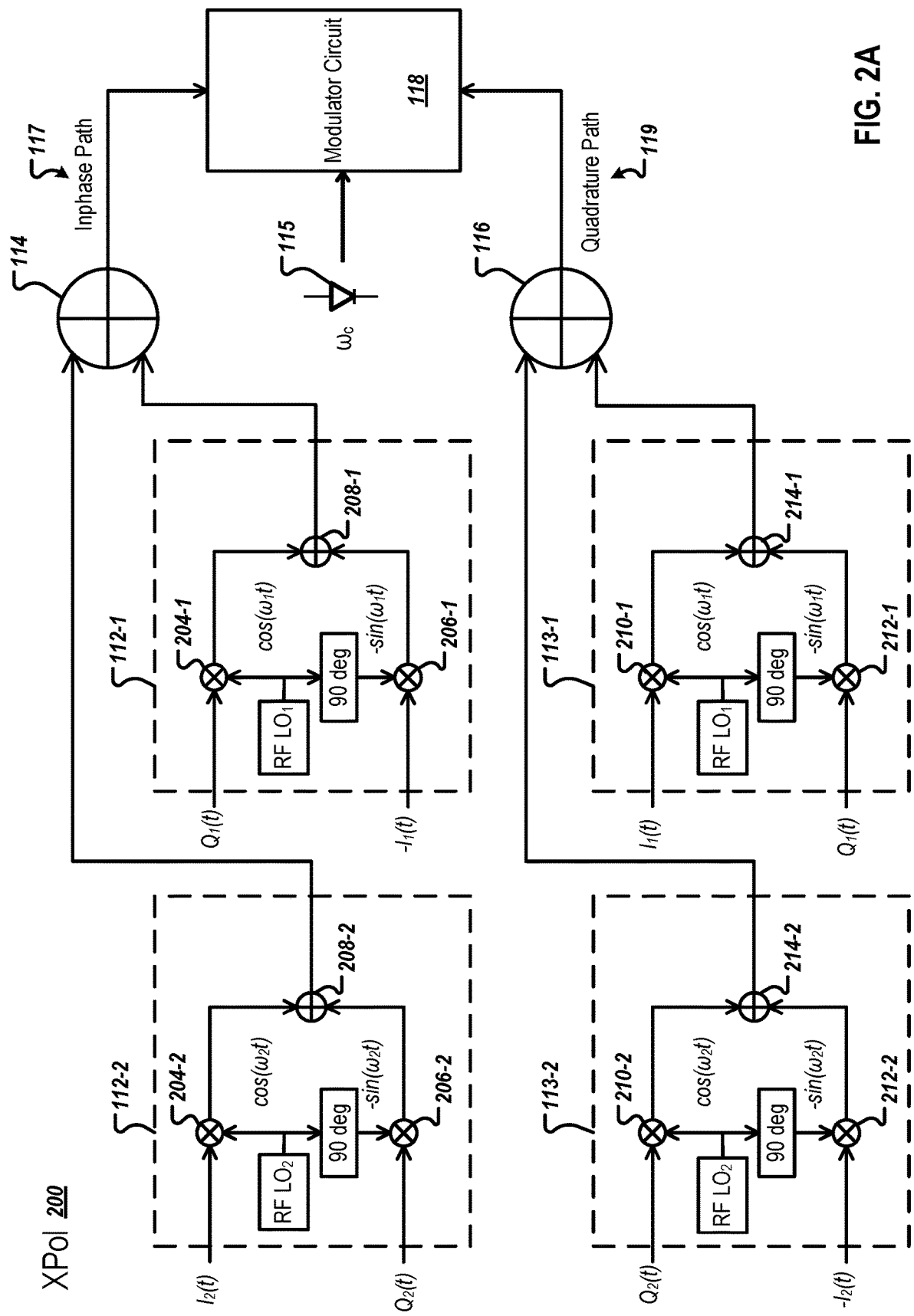
FIGS. 2A and 2B are block diagrams that illustrate example systems for RF IQ modulation for X polarization and Y polarization, respectively.
Figure 2B:
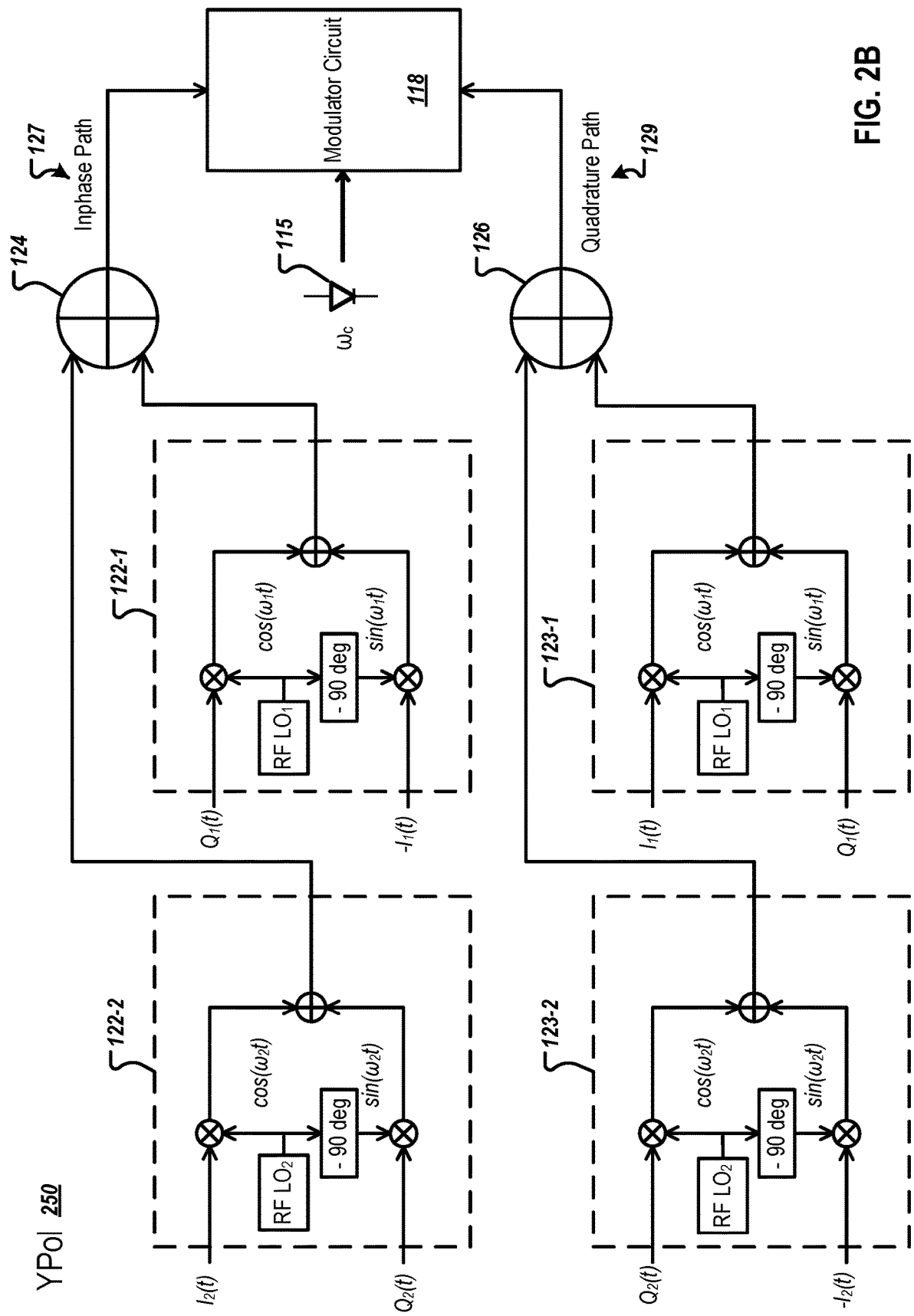

FIGS. 2A and 2B are block diagrams that illustrate example systems for RF IQ modulation for X polarization and Y polarization, respectively. The system 200 includes components similar to system 100. The system 200 illustrates a more detailed depiction of the IQ modulators 112, 113 from FIG. 1. The system 200 illustrates RF IQ modulation for one polarization, e.g., X polarization or Y polarization. For this example, the system 200 illustrates RF IQ modulation for X polarization.

The system 200 includes four example IQ modulators, 112-1, 112-2, 113-1, and 113-2. The operations of the IQ modulators 112-1, 112-2, 113-1, and 113-2 are described below. The operations of the IQ modulators 112-1, 112-2, 113-1, and 113-2 are representative of the operations of any additional IQ modulators 112-3 to 112-N and 113-3 to 113-N.

The number of IQ modulators may determine the number of generated subcarriers. For example, for a single polarization, e.g., X polarization or Y polarization, each subcarrier requires two IQ modulators, for inphase and quadrature paths, respectively. Therefore, four IQ modulators may generate two subcarriers for a single polarization. Similarly, eight IQ modulators may generate four subcarriers, sixteen IQ modulators may generate eight subcarriers, 2N IQ modulators may generate N subcarriers, etc., for a single polarization.

A detailed description of IQ modulator components and operations follows. Though described in detail with reference to only X polarization, the components and operations of the IQ modulators are the same for Y polarization, as shown in FIG. 2B.

Each IQ modulator 112, 113 includes a RF LO mixer 204, a 90-degree shifted RF LO mixer 206, and an adder 208. For example, the IQ modulator 112-1 includes RF LO mixer 204-1, 90 degree shifted RF LO mixer 206-1, and adder 208-1.

The IQ modulators 112, 113 receive inphase and quadrature signals from the TX DSP/DACs 110. In some implementations, the IQ modulators 112, 113 receive inphase and quadrature signals as analog signals with a continuous range of values. For example, the IQ modulator 112-1 receives the analog signals $Q_1(t)$ and $-I_1(t)$, while the IQ modulator 113-1 receives the analog signals $Q_1(t)$ and $I_1(t)$.

The IQ modulators 112 and 113 mix the inphase and quadrature signals with the LOs 108 from the frequency synthesizer 104. For example, the RF LO mixer 204-1 of the IQ modulator 112-1 mixes the quadrature signal $Q_1(t)$ with the RF $LO_1$ at a frequency of $\omega_1$. The 90-degree shifted RF LO mixer 206-1 mixes the inphase signal $-I_1(t)$ with the 90-degree shifted RF $LO_1$ at a frequency of $\omega_1$. The adder 208-1 of IQ modulator 112-1 combines the mixed signals to produce an IQ modulated signal. The inphase adder 114 then combines the IQ modulated signal from the IQ modulator 112-1 with the IQ modulated signal from the IQ modulator 112-2 to produce a multiplexed signal for the inphase path 117 of the modulator circuit 118. A mathematical illustration of this process is provided below.

The output of IQ modulator 112-1 is a modulated signal given by Equation 1. The output of IQ modulator 112-1 is multiplied by a factor of two in Equation 1 for mathematical convenience.

$$IQ_{112\text{-}1}=2[I_1 \sin(\omega_1 t)+Q_1 \cos(\omega_1 t)] \quad \text{(Equation 1)}$$

Similarly, the output of IQ modulator 112-2 is a modulated signal given by Equation 2.

$$IQ_{112\text{-}2}=2[I_2 \cos(\omega_2 t)-Q_2 \sin(\omega_2 t)] \quad \text{(Equation 2)}$$

The inphase adder 114 combines the modulated signals from IQ modulators 112-1 and 112-2. The multiplexed signal output by the inphase adder 114 is given by Equation 3.

$$\text{Inphase Path}=2[I_1 \sin(\omega_1 t)+Q_1 \cos(\omega_1 t)+I_2 \cos(\omega_2 t)-Q_2 \sin(\omega_2 t)] \quad \text{(Equation 3)}$$

Similarly, the RF LO mixer 210-1 of the IQ modulator 113-1 mixes the signal $I_1(t)$ with the RF $LO_1$ at a frequency of $\omega_1$. The 90-degree shifted RF LO mixer 212-1 mixes the quadrature signal $Q_1(t)$ with the 90 degree shifted RF $LO_1$ at a frequency of $\omega_1$. The adder 214-1 of the IQ modulator 113-1 combines the mixed signals to produce an IQ modulated signal. The quadrature adder 116 then combines the IQ modulated signal from the IQ modulator 113-1 with the IQ modulated signal from the IQ modulator 113-2 to produce a multiplexed signal for the quadrature path 119 of the modulator circuit 118. A mathematical illustration of this process is provided below.

The output of IQ modulator 113-1 is a modulated signal given by Equation 4. The output of IQ modulator 113-1 is multiplied by a factor of two in Equation 4 for mathematical convenience.

$$IQ_{113\text{-}1}=2[I_1 \cos(\omega_1 t)-Q_1 \sin(\omega_1 t)] \quad \text{(Equation 4)}$$

Similarly, the output of IQ modulator 113-2 is a modulated signal given by Equation 5.

$$IQ_{113\text{-}2}=2[I_2 \sin(\omega_2 t)+Q_2 \cos(\omega_2 t)] \quad \text{(Equation 5)}$$

The quadrature adder 116 combines the modulated signals from IQ modulators 113-1 and 113-2. The multiplexed signal output by the quadrature adder 116 is given by Equation 6.

$$\text{Quadrature Path}=2[I_1 \cos(\omega_1 t)-Q_1 \sin(\omega_1 t)+I_2 \sin(\omega_2 t)+Q_2 \cos(\omega_2 t)] \quad \text{(Equation 6)}$$

The modulator circuit 118 receives the multiplexed signals from the inphase adder 114 and the quadrature adder 116 through the inphase path 117 and the quadrature path 119. The modulator circuit 118 performs Mach-Zehnder modulation on the multiplexed signals to produce a WDM signal with subcarriers, as described in reference to FIG. 3.

FIG. 2B is a block diagram that illustrates an example of a system 250 for RF IQ modulation for Y polarization. The structure and operations of the system 250 are similar to the structure and operations of the system 200. The system 250 illustrates RF IQ modulation for one polarization, e.g., X polarization or Y polarization. For this example, the system 250 illustrates RF IQ modulation for Y polarization.

The system 250 includes four example IQ modulators, 122-1, 122-2, 123-1, and 123-2. Components of the IQ modulators 122, 123 are the same as components of the IQ modulators 112, 113. Operations of the components of the IQ modulators 122, 123 are the same as the operations of the components of the IQ modulators 112, 113. Operations of the inphase adder 124 and the quadrature adder 126 are the same as the operations of the inphase adder 114 and the quadrature adder 116, respectively.

The modulator circuit 118 receives the multiplexed signals from the inphase adder 124 and the quadrature adder 126 through the inphase path 127 and the quadrature path 129. The modulator circuit 118 performs Mach-Zehnder modulation on the multiplexed signals to produce a WDM signal with subcarriers, as described in reference to FIG. 3.

Figure 3:
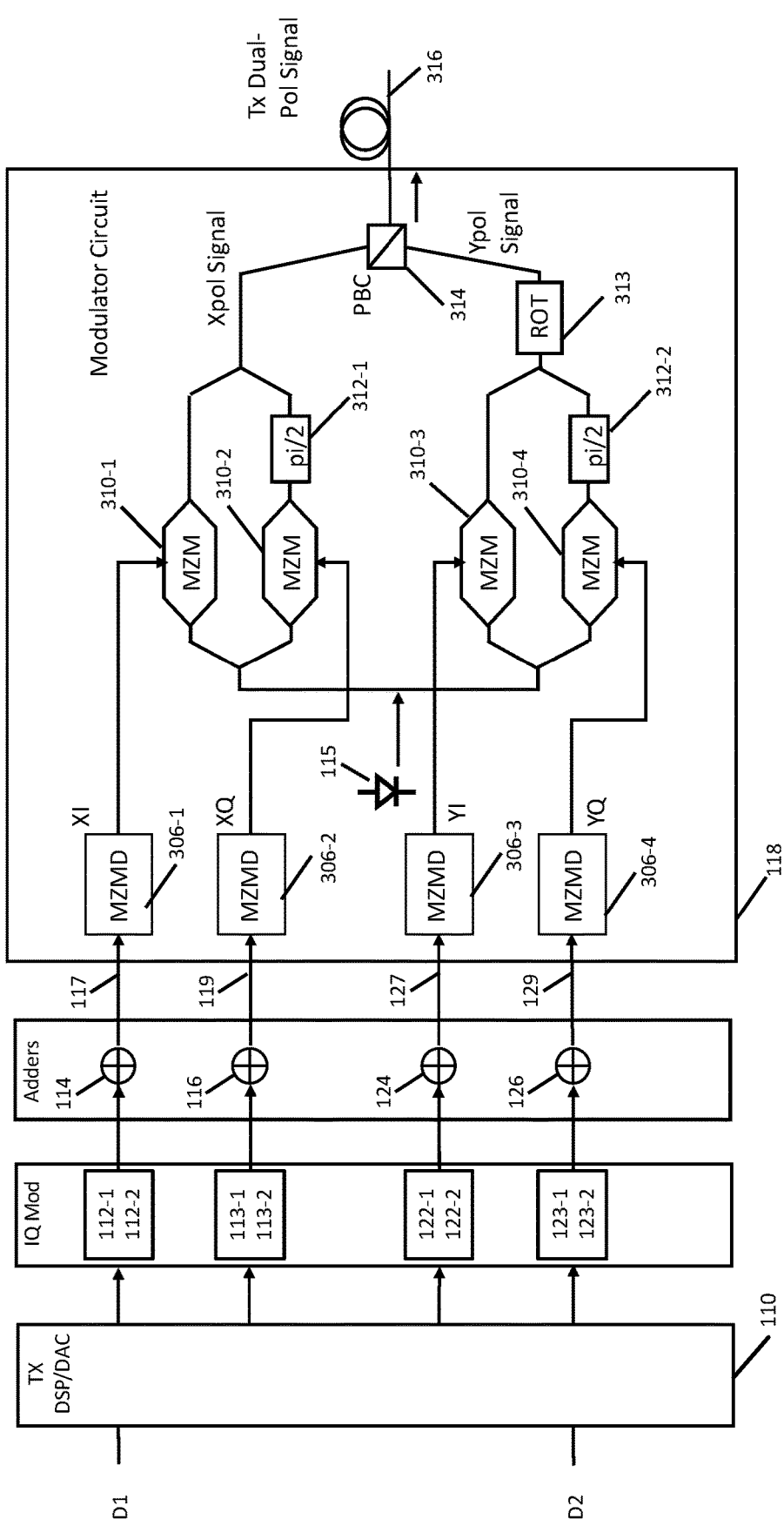
FIG. 3 is a block diagram that illustrates an example of a system for Mach-Zehnder modulation.

FIG. 3 is a block diagram that illustrates an example of a system 300 for Mach-Zehnder modulation. The system 300 includes components similar to system 100. The system 300 illustrates a more detailed depiction of the modulator circuit 118 from FIG. 1. The system 300 illustrates Mach-Zehnder modulation for two polarizations, e.g., X polarization and Y polarization.

The system 300 may include a TX DSP/DAC block including the TX DSP/DACs 110, an IQ modulator block including the IQ modulators 112, 113, 122, 123, an adder block including the adders 114, 116, 124, 126, and the modulator circuit 118. The modulator circuit 118 may include driver circuits 306-1 to 306-4, modulators 310-1 to 310-4, phase shifters 312-1, 312-2, a polarization rotator 313, and a polarization beam combiner (PBC) 314.

The TX DSP/DACs 110 receive data inputs D1, D2. Based on data inputs D1, D2, TX DSP/DACs 110 may supply analog signals to IQ modulators 112, 113, 122, 123. The IQ modulators 112, 113, 122, 123 output modulated signals to the inphase and quadrature adders 114, 116, 124, 126, as described in reference to FIGS. 2A and 2B. In this example, the system 300 includes four IQ modulators, e.g., the IQ modulators 112-1, 112-2, 113-1, and 113-2, for each polarization. In some examples, the system 300 can include additional IQ modulators 112-3 to 112-N and 113-3 to 113-N for each polarization.

The inphase and quadrature adders 114, 116, 124, 126, combine the modulated signals from the IQ modulators 112, 113, 122, 123. The inphase adders 114, 124 output multiplexed signals to the driver circuits 306-1 and 306-3, for X polarization and Y polarization, respectively. The quadrature adders 116, 126 output multiplexed signals to the driver circuits 306-2 and 306-4, for X polarization and Y polarization, respectively. The driver circuits 306-1 to 306-4 receive the signals from the adders 114, 116, 124, 126, and adjust the voltages or other characteristics to provide drive signals to a corresponding one of modulators 310-1 to 310-4.

The modulators 310-1 to 310-4 may each be a Mach-Zehnder modulator (MZM) that modulates the phase and/or amplitude of the light output from the laser 115. Light output from the laser 115 is split, such that a first portion of the light is supplied to a first MZM pairing including MZMs 310-1 and 310-2, and a second portion of the light is supplied to a second MZM pairing including MZMs 310-3 and 310-4. The first portion of the light is further split into third and fourth portions, such that the third portion is modulated by MZM 310-1 to provide an in-phase component of an X (or TE) polarization component of the modulated optical signal, and the fourth portion is modulated by MZM 310-2 and fed to phase shifter 312-1 to shift the phase of such light by 90 degrees in order to provide a quadrature component of the X polarization (Xpol) component of the modulated optical signal.

The output of MZM 310-1 and phase shifter 312-1 is a result of modulating the light output from the laser 115 based on the multiplexed signals from the adders 114, 116, shifted by 90 degrees. The output of MZM 310-1 and phase shifter 312-1 is given by Equation 7.

$$Xpol\ \text{signal} = 2[I_1 \sin(\omega_1 t) + Q_1 \cos(\omega_1 t) + I_2 \cos(\omega_2 t) - Q_2 \sin(\omega_2 t)] \cos(\omega_c t) + 2[I_1 \cos(\omega_1 t) - Q_1 \sin(\omega_1 t) + I_2 \sin(\omega_2 t) + Q_2 \cos(\omega_2 t)](-\sin(\omega_c t)) \quad \text{(Equation 7)}$$

Similarly, for Y polarization, the second portion of the light is further split into fifth and sixth portions, such that the fifth portion is modulated by MZM 310-3 to provide an I component of a Y (or TM) polarization component of the modulated optical signal, and the sixth portion is modulated by MZM 310-4 and fed to phase shifter 312-2 to shift the phase of such light by 90 degrees to provide a Q component of the Y polarization component of the modulated optical signal. The output of MZM 310-3 and phase shifter 312-2 is similar to the output of MZM 310-1 and phase shifter 312-1, with a Y polarization.

The optical outputs of MZMs 310-1 and 310-2 are combined to provide an X polarized optical signal including I and Q components and fed to a polarization beam combiner (PBC) 314. In addition, the outputs of MZMs 310-3 and 310-4 are combined to provide an optical signal that is fed to polarization rotator 313 that rotates the polarization of such optical signal to provide a modulated optical signal having a Y (or TM) polarization. The Y polarized modulated optical signal is also provided to PBC 314, which combines the X and Y polarized modulated optical signals to provide a polarization multiplexed dual polarization ("dual-pol") modulated optical signal onto optical fiber 316, for example, which may be included as a segment of optical fiber in transmission channel 120.

The polarization multiplexed optical signal output from modulator circuit 118 includes subcarriers $SC_1$, $SC_2$, for example, such that each subcarrier has X and Y polarization components and I and Q components. The maximum number of subcarriers depend on the bandwidth of the modulator circuit 118. The subcarriers can be grouped and/or paired into a carrier within a WDM signal.

The center frequencies of each of the subcarriers are dependent on the frequency of the light output from the laser 115, and the frequencies of the RF LOs, e.g., $RF\ LO_1$ and $RF\ LO_2$. For example, Equation 7 combines and simplifies to Equation 8 to provide the center frequencies of each of the subcarriers. From Equation 7 to 8, a factor of 2 is dropped for simplicity. It is noted that the final expression in Equation 8 is a complex envelope representation of a passband signal, where RE denotes the real part of a complex number.

$$\begin{aligned} Xpol\ \text{signal} &= -I_1 \sin(\omega_c - \omega_1)t + Q_1 \cos(\omega_c - \omega_1)t + \\ &\quad I_2 \cos(\omega_c + \omega_2)t - Q_2 \sin(\omega_c + \omega_2)t \\ &= RE\{(I_2 + jQ_2)\exp(j(\omega_c + \omega_2)t\} + RE\{(Q_1 + jI_1) \\ &\quad \exp(j(\omega_c - \omega_1)t\} \end{aligned} \quad \text{(Equation 8)}$$

Therefore, for X polarization, the system 300, including the four IQ modulators 112-1, 112-2, 113-1, and 113-2, produces a WDM signal with two subcarriers: $SC_1$, $SC_2$. The WDM signal includes a first subcarrier $SC_1$ centered at a frequency of $\omega_c - \omega_1$, and a second subcarrier $SC_2$ centered at a frequency of $\omega_c + \omega_2$. In some examples, the system 300 can include additional IQ modulators 112-3 to 112-N and 113-3 to 113-N for X polarization, and additional IQ modulators 123-3 to 123-N for Y polarization, where each additional pair of IQ modulators results in an additional subcarrier of the WDM signal. Additional odd-numbered subcarriers can be centered at frequencies below the laser frequency, e.g., $SC_3$ is centered at a frequency of $\omega_c - \omega_3$. Additional even numbered subcarriers can be centered at frequencies above the laser frequency, e.g., $SC_4$ is centered at a frequency of $\omega_c + \omega_4$. The construction of subcarriers within a WDM signal is described in greater detail in reference to FIGS. 5 and 6.

Figure 4:
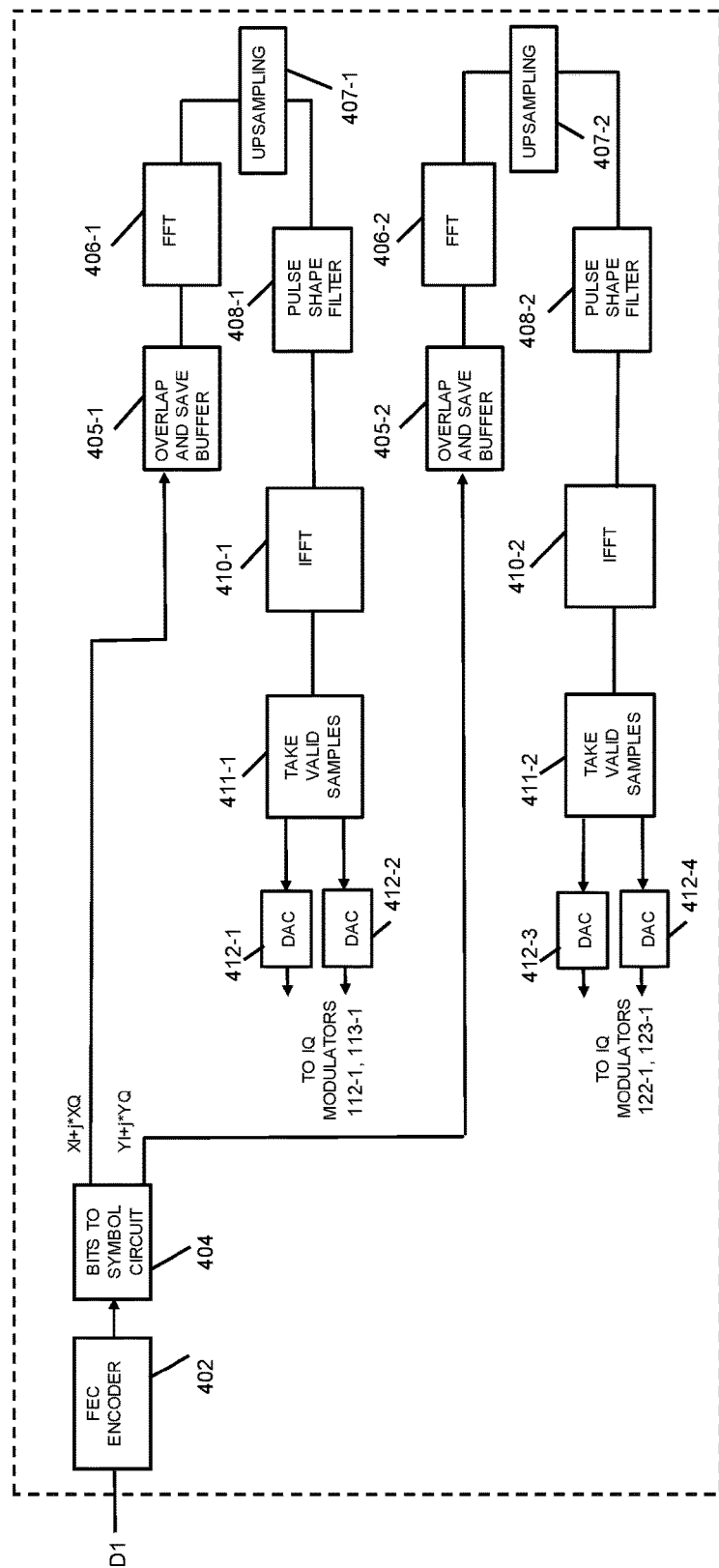
FIG. 4 is a block diagram that illustrates an example of a system for digital signal processing (DSP) and digital to analog conversion (DAC).

FIG. 4 is a block diagram that illustrates an example of a TX DSP/DAC 110 for digital signal processing (DSP) and digital to analog conversion (DAC). FIG. 4 illustrates a single example TX DSP/DAC 110 processing a single example input data D1. However, as shown in FIG. 1, multiple TX DSP/DACs can process multiple data inputs. For example, TX DSP/DACs 110-1, 110-2, shown in FIG. 1, can receive data inputs D1, D2.

The TX DSP/DAC 110 may include FEC encoder 402, which may receive data input D1. FEC encoder 402 carries out forward error correction coding on a corresponding one of the switch outputs, such as by adding parity bits to the received data. FEC encoder 402 may also provide timing skew between the subcarriers to correct for skew introduced during transmission over one or more optical fibers. In addition, FEC encoder 402 may interleave the received data.

FEC encoder 402 provides an output to a bits-to-symbol circuit 404. Bits to symbol circuit 404 may map the encoded bits to symbols on a complex plane. For example, bits to symbol circuit 404 may map four bits to a symbol in a dual-polarization QPSK constellation or more than 4 bits to a symbol in a dual-polarization high-order QAM constellation.

Bits to symbol circuit 404 provides first symbols, having the complex representation XI+j*XQ, associated with the data input D1. Data indicative of such first symbols may be carried by the X polarization component of subcarrier $SC_1$. The bits to symbol circuit 404 may further provide second symbols having the complex representation YI+j*YQ, also associated with the data input D1. Data indicative of such second symbols, however, is carried by the Y polarization component of subcarrier $SC_1$.

As further shown in FIG. 4, the first symbols output from the bits to symbol circuit 404 are supplied to an overlap and save buffer 405-1 that may buffer 256 symbols, for example. The overlap and save buffer 405-1 may receive 128 of the first symbols or another number of such symbols at a time from the bits to symbol circuit 404. Thus, overlap and save buffer 405-1 may combine 128 new symbols from bits to symbol circuit 404 with the previous 128 symbols received from bits to symbol circuit 404.

The overlap and save (OLS) buffer 405-1 supplies an output, which is in the time domain, to a fast Fourier Transform (FFT) circuit 406-1. In one example, the output includes 256 symbols or another number of symbols. The FFT 406-1 converts the received symbols to the frequency domain using or based on, for example, a fast Fourier transform. The FFT 406-1 may include 256 memories or registers, also referred to as frequency bins or points, that store frequency components associated with the input symbols.

An upsampling circuit 407-1 can perform upsampling on the output of the FFT 406-1. The upsampling circuit 407-1 aligns the output of the FFT 406-1 with the sampling rate of the pulse shape filter 408-1. The sampling rate of the pulse shape filter 408-1 may depend on a rolloff factor α of the pulse shape filter 408-1. For example, the sampling rate of the pulse shape filter 408-1 may be at least (1+α) times the baud rate of the signal. The pulse shape filter 408-1 performs pulse shaping on the signal to produce a corresponding element vector.

Next, IFFT circuit or component 410-1 may receive an element vector and provide a corresponding time domain signal based on an inverse fast Fourier transform (IFFT). In one example, the time domain signal may have a rate of 64 GSample/s, which may be designed according to the sampling rate of DACs. The OLS principle is then applied to take the valid filtered signal samples 411-1 from the last buffer or memory circuit and supply the samples to DACs 412-1 and 412-2 at 64 GSample/s, for example. The DAC 412-1 is associated with the inphase (I) component of the X polarization signal and the DAC 412-2 is associated with the quadrature (Q) component of the X polarization signal. Accordingly, DAC 412-1 and 412-2 provide inphase and quadrature analog outputs to IQ modulators 112, 113 for X polarization.

The bits to symbol circuit 404 outputs symbols indicative of data carried by the Y polarization component of the polarization multiplexed modulated optical signal output on fiber 316. These symbols may have the complex representation YI+j*YQ. Such symbols may be processed block-by-block by an overlap and save buffer 405-2, FFT circuit 406-2, upsampling circuit 407-2, pulse shape filter circuit 408-2, IFFT 410-2, and take valid samples circuit 411-2, to provide processed signal samples in a manner similar to or the same as that discussed above in generating signal samples from take valid samples circuit 411-1. DACs 412-3 and 412-4 provide analog outputs to IQ modulators 122, 123 for Y polarization.

While FIG. 4 shows the TX DSP/DAC 110 as including a particular quantity and arrangement of functional components, in some implementations, the TX DSP/DAC may include additional functional components, fewer functional components, different functional components, or differently arranged functional components. Additionally, though FIG. 4 illustrates a single TX DSP/DAC 110 processing a single input data D1, multiple TX DSP/DACs can receive multiple data inputs. For example, TX DSP/DACs 110-1 to 110-N, shown in FIG. 1, can receive data inputs D1 to DN. Similarly, N number TX DSP/DACs can generate N number of subcarriers for each of X polarization and Y polarization.

Figure 5:
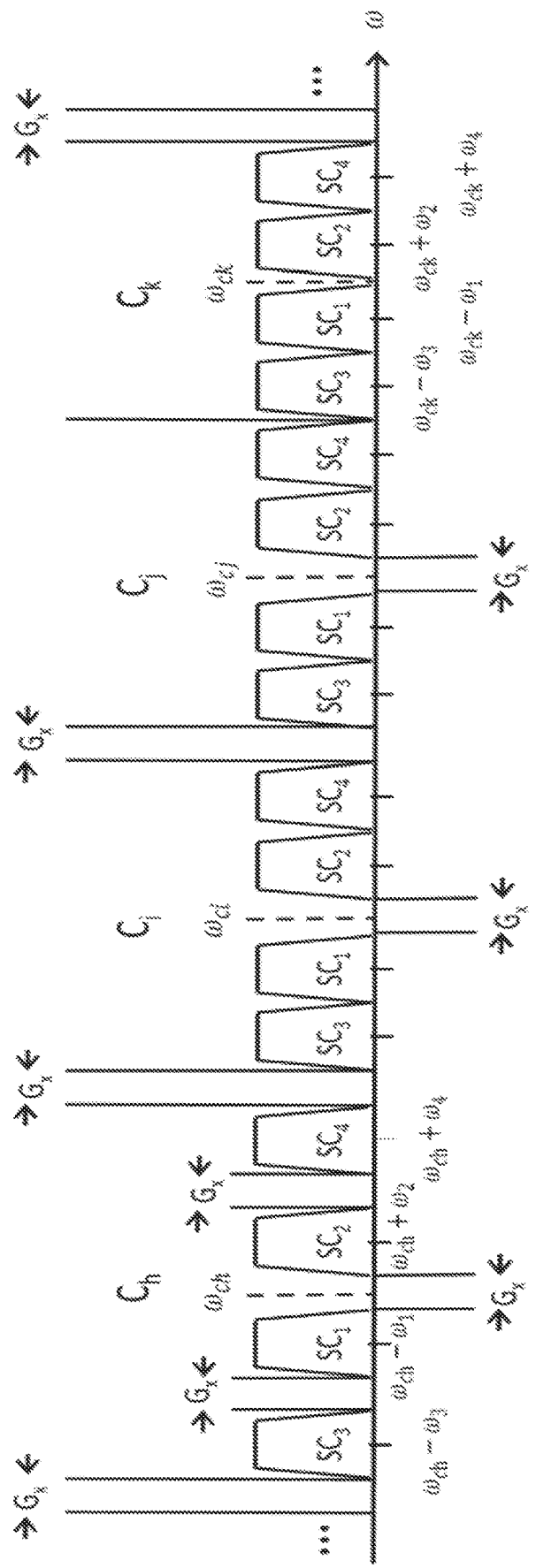
FIG. 5 is a graph of an example WDM signal with subcarriers in a flex grid.

FIG. 5 is a frequency domain graph of an example WDM signal 500 with subcarriers in a flex grid. For example, the WDM signal 500 may be an output signal from the system 100. The WDM signal 500 may transmit through a DWDM optical network. An example DWDM optical network is a flex grid DWDM. The WDM signal 500 may be either an X polarization or Y polarization signal.

The WDM signal 500 includes four carriers, $C_h$ to $C_k$. Each carrier $C_h$ to $C_k$ includes subcarriers $SC_1$ to $SC_4$. Each carrier $C_h$ to $C_k$ has a center frequency $\omega_c$, e.g, $\omega_{ch}$ to $\omega_{ck}$. The subcarriers $SC_1$ to $SC_4$ can be routed through the optical network in channels. In some implementations, a channel may include one subcarrier, e.g., $SC_1$. In some implementations, a channel may include more than one subcarrier, e.g., $SC_1$ and $SC_2$. Two or more subcarriers routed together can be referred to as a superchannel. For example, two or more adjacent digital subcarriers with a small frequency gap of 10's or 100's of MHz, or no frequency gap (0 GHz), between the subcarriers may be routed together in a superchannel. In some implementations, two or more subcarriers that are in different carriers $C_h$ to $C_k$ may be routed in a superchannel. An example is shown in FIG. 5 where two subcarriers from carrier Cj ($SC_2$ and $SC_4$) are combined with four subcarriers from carrier $C_k$ ($SC_1$, $SC_2$, $SC_3$, and $SC_4$) to form a superchannel of six subcarriers that are routed together through the DWDM line system transmission channel.

The frequency spacing between adjacent subcarriers can be controlled for different purposes. For better spectral efficiency, the frequency spacing between adjacent subcarriers can be configured to be very small, e.g., as small as 0 GHz at the transmitter. When the subcarriers reach the receiver, the subcarriers may have a small amount of frequency overlap. A second purpose is to intentionally introduce a larger spacing between adjacent subcarriers to allow routing of sets of subcarriers through and by the DWDM line system transmission channel. The subcarrier gaps $G_x$ can segregate subcarriers into groups of subcarriers, with each group of subcarriers routed together through the DWDM line system transmission channel.

The WDM signal 500 has an intra-carrier gap G. The gap G is the total gap budgeted for the carrier. The gap G can be allocated across several subcarrier gaps $G_x$. Example ranges of the gap G can vary from approximately 100 MHz to approximately 20 GHz. An example gap G can be 18.75 GHz. The gap G can be allocated between 0, 1, 2, or N subcarrier gaps $G_x$.

The subcarrier gap $G_x$ is the size of the gap between adjacent subcarriers within each carrier. In some examples, there may not be a subcarrier gap $G_x$ between adjacent subcarriers, e.g., the subcarrier gap $G_x$ may be 0 GHz. For an example intra-carrier gap G of 18.75 GHz allocated between three subcarrier gaps $G_x$, the subcarrier gap $G_x$ between subcarriers can be one third of the intra-carrier gap G, or $G_x$=6.25 GHz. Example ranges of the subcarrier gap $G_x$ can vary from 0 GHz to a maximum of the intra-carrier gap G. In some implementations, the frequency widths of subcarriers $SC_1$, $SC_2$, $SC_3$, and $SC_4$ within each carrier may vary. The subcarrier gaps $G_x$ between subcarriers within a carrier may also vary.

In some examples, the subcarriers within a carrier might not occupy the center frequency $\omega_c$, e.g, $\omega_{ch}$ to $\omega_{ck}$. The center frequency of each subcarrier is offset from the center frequency by $\omega_1$ to $\omega_4$. For example, the center frequency of subcarrier $SC_1$ in carrier $C_h$ is $\omega_{ch}-\omega_1$, and the center frequency of subcarrier $SC_4$ in carrier $C_h$ is $\omega_{ch}+\omega_4$. Within each carrier $C_h$ to $C_k$, the subcarriers $SC_1$ to $SC_4$ are symmetric about $\omega_c$. For example, $\omega_1=\omega_2$, and $\omega_3=\omega_4$. In some examples, up to a maximum of ½ G can be allocated on either side of the center frequency $\omega_c$.

The frequency width of each carrier is the sum of the widths of the subcarriers and the widths of the gaps $G_x$, as show in Equation 9.

$$C_n = \Sigma SC_n + \Sigma G_n \quad \text{(Equation 9)}$$

In the carrier $C_h$, each subcarrier $SC_1$ to $SC_4$ is independently routed in a channel, with the channel width equal to the width of an individual subcarrier. Each subcarrier $SC_1$ to $SC_4$ has an equal frequency width such that $SC_1=SC_2=SC_3=SC_4$. Each subcarrier $SC_1$ to $SC_4$ is separated by a subcarrier gap $G_x$. Thus, the frequency width of carrier $C_h$ is given by Equation 10.

$$C_h = 4 \times SC_1 + 3 \times G_x \quad \text{(Equation 10)}$$

The carrier $C_i$ includes four subcarriers routed as pairs. The first pair includes subcarriers $SC_3$ and $SC_1$, and the second pair includes subcarriers $SC_2$ and $SC_4$. The gap between $SC_3$ and $SC_1$ is 0 GHz, and the gap between $SC_2$ and $SC_4$ is 0 GHz. Each pair is routed in a superchannel, with the superchannel width equal to two times the width of an individual subcarrier, or $2SC_N$. The gap between $SC_1$ and $SC_2$ is $G_x$. Thus, the frequency width of carrier $C_i$ is given by Equation 11.

$$C_i = 4 \times SC_1 + G_x \quad \text{(Equation 11)}$$

In the WDM signal 500, the carrier $C_j$, like the carrier $C_i$, includes two pairs of subcarriers separated by the gap $G_x$. Thus, the frequency width of carrier $C_j$ is given by Equation 12.

$$C_j = 4 \times SC_1 + G_x \quad \text{(Equation 12)}$$

The carrier $C_k$ includes four subcarriers $SC_1$ to $SC_4$, with each subcarrier separated by a gap of 0 GHz. Thus, the frequency width of carrier $C_k$ is given by Equation 13.

$$C_k = 4 \times SC_1 \quad \text{(Equation 13)}$$

Subcarriers $SC_3$ and $SC_1$ of carrier $C_j$ are routed in a superchannel as a pair of subcarriers. The gap between subcarrier $SC_4$ of carrier $C_j$, and subcarrier $SC_3$ of carrier $C_4$, is 0 GHz. Thus, the subcarriers $SC_2$ and $SC_4$ are routed with subcarriers $SC_1$ to $SC_4$ from neighboring carrier $C_k$. Therefore, subcarriers $SC_2$ and $SC_4$ of carrier $C_j$, and subcarriers $SC_1$ to $SC_4$ of carrier $C_k$, are routed in a superchannel as a set of six subcarriers with a frequency width given by Equation 14.

$$\text{Superchannel} = 6 \times SC_1 \quad \text{(Equation 14)}$$

Figure 6:
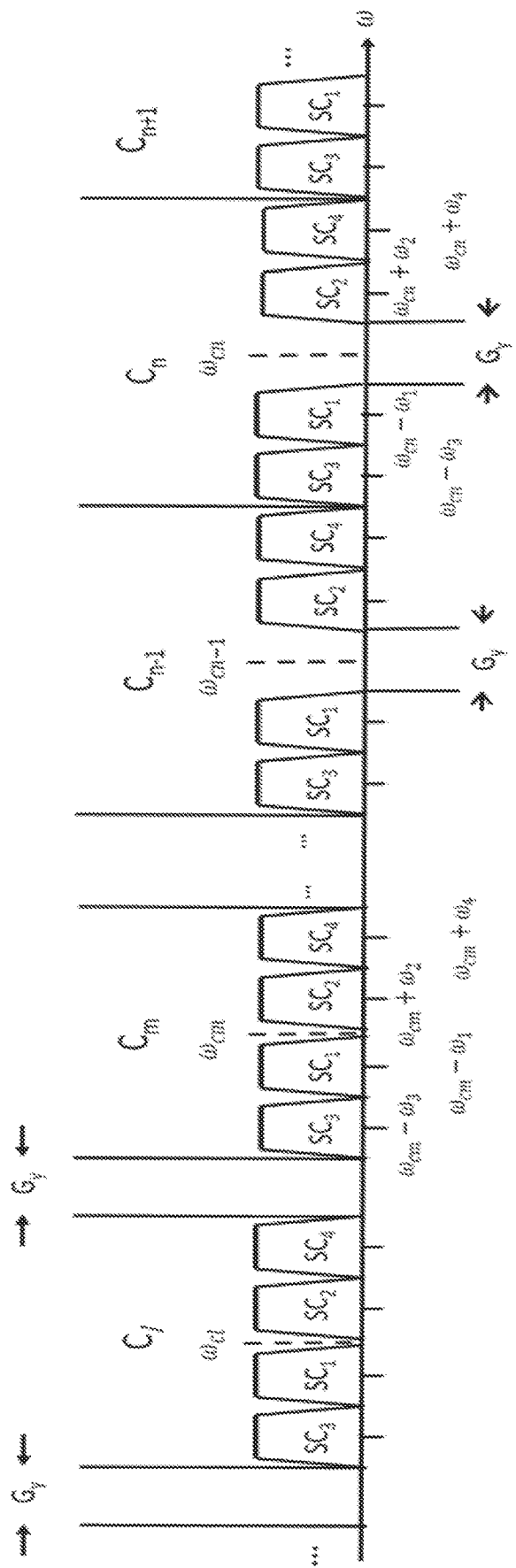
FIG. 6 is a graph of an example WDM signal with subcarriers in a fixed grid.

FIG. 6 is a graph of an example WDM signal 600 with subcarriers in a fixed grid. The WDM signal 600 can be, for example, a WDM signal transmitting through a DWDM optical network application with Legacy ITU 694.1 coarse tolerance filters. The WDM signal 600 includes subcarriers with intra-carrier gaps allocated between subcarriers. The fixed grid may include a subcarrier gap of, for example, $G_y$=12.5 GHz. The WDM signal 600 includes carriers $C_l$ to $C_{n+1}$. The WDM signal 600 may be either an X polarization or Y polarization signal.

In WDM signal 600, sets of four subcarriers are routed together. Carriers $C_l$ and $C_m$ each include four subcarriers $SC_1$ to $SC_4$, with no gaps between the four subcarriers. Each subcarrier $SC_1$ to $SC_4$ has an equal frequency width such that $SC_1=SC_2=SC_3=SC_4$. An inter-carrier gap $G_y$ is located between the adjacent carriers $C_l$ and $C_m$. The center frequency of each subcarrier is offset from the center frequency of the carrier by $\omega_1$ to $\omega_4$. For example, the center frequency of subcarrier $SC_1$ in carrier $C_m$ is $\omega_{cm}-\omega_1$, and the center frequency of subcarrier $SC_4$ in carrier $C_m$ is $\omega_{cm}+\omega_4$. Within each carrier $C_l$ and $C_m$, the subcarriers $SC_1$ to $SC_4$ are symmetric about $\omega_c$. For example, $\omega_1=\omega_2$, and $\omega_3=\omega_4$. The four subcarriers in each carrier $C_l$ and $C_m$ are routed together in a superchannel. The frequency width of each carrier $C_l$ and $C_m$ is given by Equation 15.

$$C_l = C_m = 4 \times SC_1 \quad \text{(Equation 15)}$$

For carriers $C_{n-1}$, $C_n$, and $C_{n+1}$, the intracarrier Gap G is allocated fully as a single gap $G_y$ between the middle subcarriers $SC_1$ and $SC_2$ of each carrier. One half of the gap $G_y$ is allocated to either side of the center frequency. The center frequency of each subcarrier is offset from the center frequency by $\omega_1$ to $\omega_4$. For example, the center frequency of subcarrier $SC_2$ in carrier $C_n$ is $\omega_{cn}+\omega_2$, and the center frequency of subcarrier $SC_3$ in carrier $C_n$ is $\omega_{cn}-\omega_3$. Within each carrier $C_{n-1}$, $C_n$, and $C_{n+1}$, the subcarriers $SC_1$ to $SC_4$ are symmetric about $\omega_c$. For example, $\omega_1=\omega_2$, and $\omega_3=\omega_4$. The frequency width of each carrier $C_{n-1}$, $C_n$, and $C_{n+1}$, is given by Equation 16.

$$C_{n-1} = C_n = C_{n+1} = 4 \times SC_1 + G_y \quad \text{(Equation 16)}$$

The locations of the gaps enable pairs of subcarriers within one carrier to be routed with pairs of subcarrier within a neighboring carrier. Thus, pairs of subcarriers from adjacent carriers are routed together in superchannels each of which contains four subcarriers. For example, subcarriers $SC_2$ and $SC_4$ of carrier $C_{n-1}$, and subcarriers $SC_3$ and $SC_1$ of carrier $C_n$, are routed together in a superchannel with a frequency width of $4 \times SC_1$.

Figure 7:
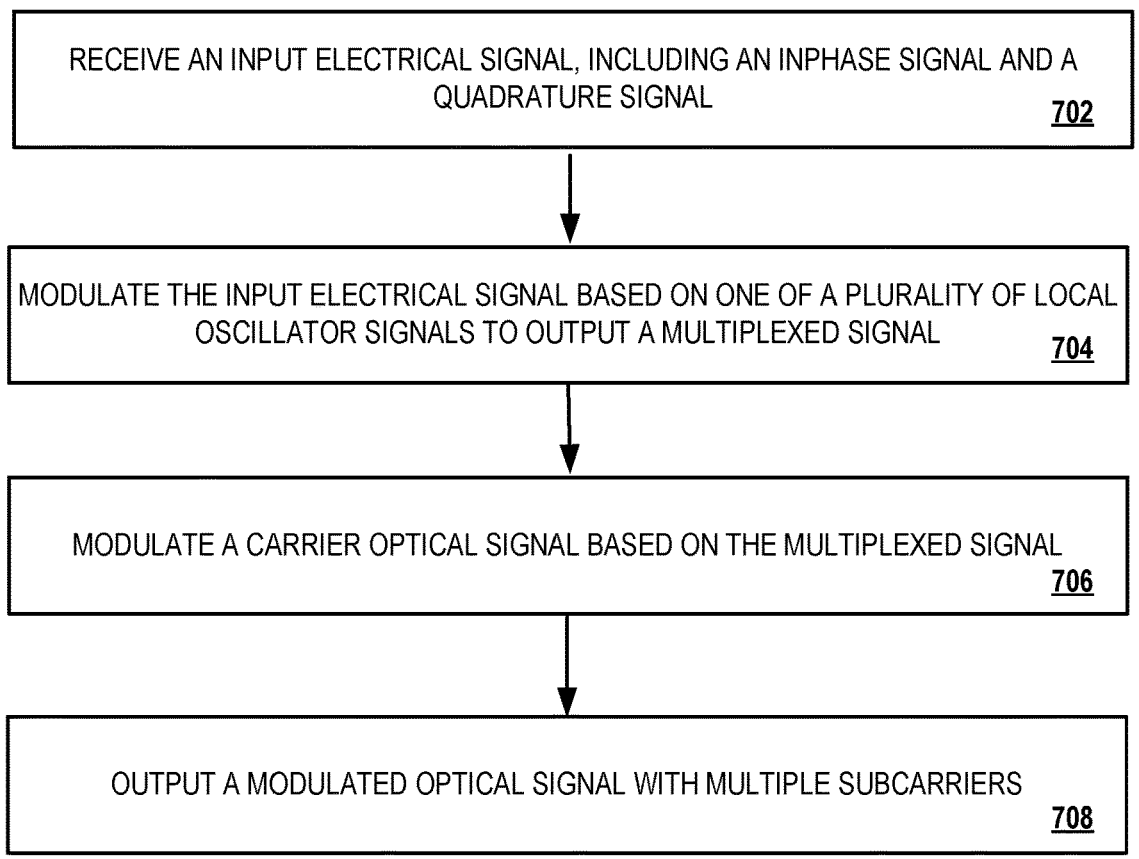
FIG. 7 is a flow diagram that illustrates an example of a process for subcarrier modulation using RF IQ modulators.

FIG. 7 is a flow diagram that illustrates an example of a process 700 for subcarrier modulation using IQ modulators. Generally, the process 700 includes receiving an input electrical signal, including inphase and quadrature signal samples (702), modulating the input electrical signal based on one of a plurality of local oscillator signals to output a multiplexed signal (704), modulating a carrier optical signal based on the multiplexed signal (706), and outputting a modulated optical signal with multiple subcarriers (708).

During 702, the system receives an input electrical signal from a data source. The system can be, for example, the system 100. The input electrical signal may include an inphase signal and a quadrature signal. The system can receive a bit stream or byte stream, which is to be transmitted over a transmission channel, e.g., the transmission channel 120.

During 704, the system modulates the input electrical signal based on one of a plurality of analog RF LOs to output a multiplexed signal. The RF LOs can be, for example, the RF LOs 108 produced by the LO circuits 105. The RF LOs may each have a frequency that corresponds to the center frequency of a subcarrier. For example, RF $LO_1$ may have a frequency $\omega_1$, and RF $LO_N$ may have a frequency $\omega_N$. The system may modulate the input electrical signal based on one or more RF LOs using an FQ modulator, e.g., the I/Q modulators 112, 113, to output the multiplexed signal.

During 706, the system modulates a carrier optical signal based on the multiplexed signal. The carrier optical signal may be, for example, an optical light beam from a laser, e.g., the laser 115. The system may modulate the carrier optical signal based on the multiplexed signal using a modulator circuit, e.g., the modulator circuit 118. The modulator circuit may include driver circuits, e.g., the driver circuits 306-1 to 306-4, and Mach-Zehnder modulators, e.g., the Mach-Zehnder modulators 310-1 to 310-4.

During 708, the system outputs a modulated optical signal with multiple subcarriers. The modulated optical signal may be, for example, the WDM signal 500 or 600. The modulated optical signal may have a center frequency $\omega_c$. The center frequency of each of the plurality of subcarriers may be offset from We by the frequency of one of the plurality of local oscillator signals. The subcarriers may be separated in the frequency domain by a frequency gap. The subcarriers may be grouped such that multiple subcarriers transmit over the optical network in a superchannel. The modulated optical signal can have a single polarization or can have a dual polarization.

Figure 8:
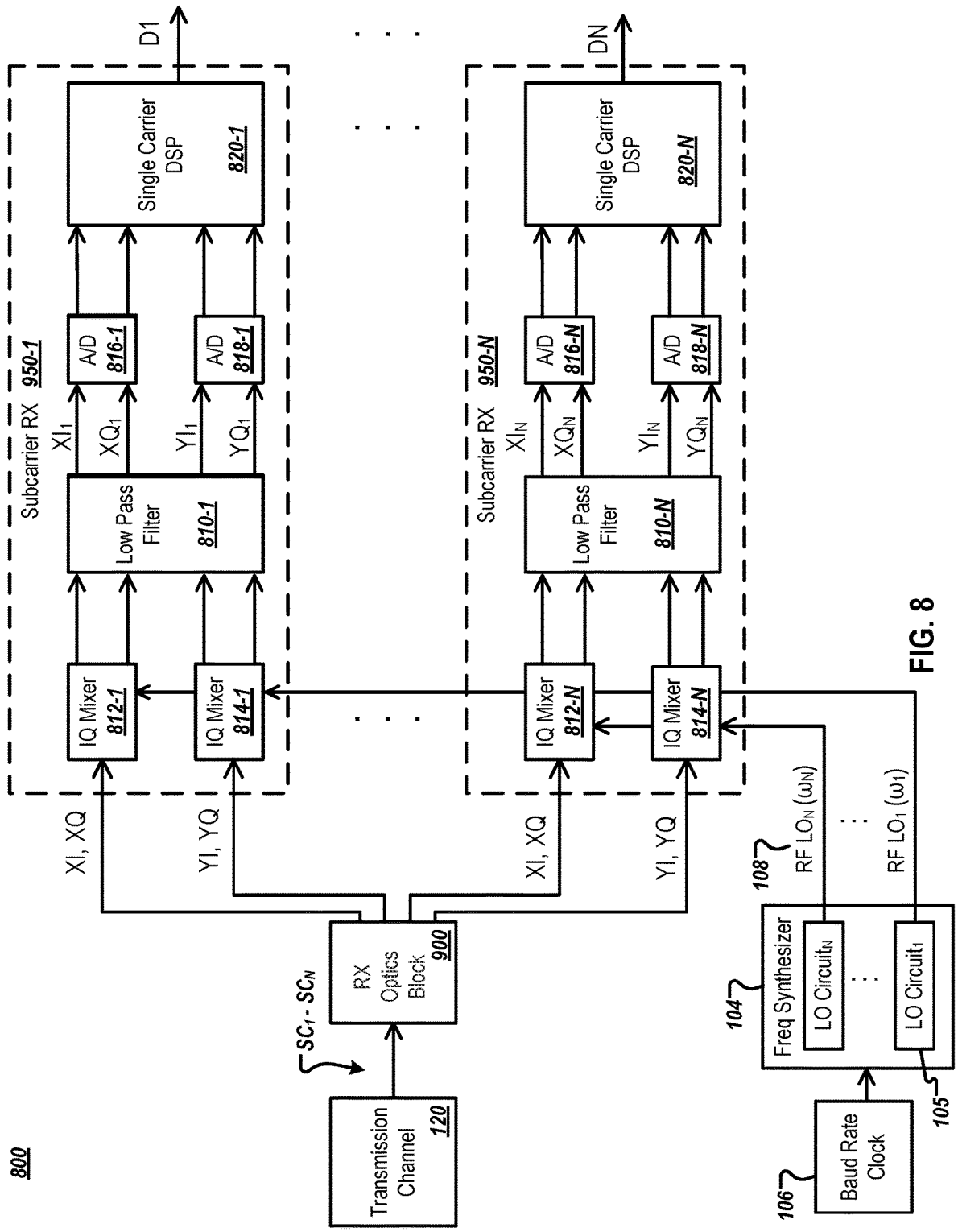
FIG. 8 is a block diagram that illustrates an example of a system for receiving carrier signals with multiple subcarriers.

FIG. 8 is a block diagram that illustrates an example of a system 800 for receiving carrier signals with multiple subcarriers. The system 800 includes the baud rate clock 106, the frequency synthesizer 104, receiver (RX) optics block 900, and subcarrier RXs 950-1 to 950-N (collectively referred to herein as subcarrier RXs 950). The subcarrier RXs 950 include IQ mixers 812-1 to 812-N and 814-1 to 814-N (collectively referred to herein as IQ mixers 812, 814), low pass filters 810-1 to 810-N (collectively referred to herein as low pass filters 810), analog to digital converters (A/Ds) 816-1 to 816-N and 818-1 to 818-N (collectively referred to herein as A/Ds 816, 818), and single carrier DSPs 820-1 to 820-N (collectively referred to herein as DSPs 820).

The RX optics block 900 receives a WDM signal with subcarriers SC1 to SCN from the transmission channel 120. The RX optics block 900 outputs inphase signals for both X and Y polarizations, and quadrature signals for both X and Y polarizations. The operations of the RX optics block 900 are discussed in greater detail in reference to FIG. 9.

The baud rate is regulated by the baud rate clock 106. The baud rate is a measure of the number of signal elements, bits, or symbols per second that can be transmitted or received. The clock circuit of the baud rate clock controls the timing of the system 800.

The frequency synthesizer 104 is an electronic circuit that generates a range of frequencies from a single reference frequency. The frequency synthesizer 104 includes LO circuits 105, including LO Circuit$_1$ to LO Circuit$_N$. The frequency synthesizer 104 may use the techniques of frequency multiplication, frequency division, direct digital synthesis, frequency mixing, and phase-locked loops to generate its frequencies. The LO circuits 105 produce RF LOs 108. For example, the LO Circuit$_1$ produces RF $LO_1$ at frequency $\omega_1$, the LO Circuit$_N$ produces RF $LO_N$ at frequency $\omega_N$, etc. The frequency synthesizer 104 provides the baud-rate related RF LOs 108 to each IQ mixer 812, 814 to set the center frequency of the demodulated subcarriers.

The RX optics block 900 feeds the inphase and quadrature signals to subcarrier RXs 950-1 to 950-N. The subcarrier RXs 950-1 to 950-N each demodulates one of the subcarriers SC1 to SCN, respectively. The subcarrier RXs 950 each uses IQ mixers 812, 814 and a locally generated RF frequency $\omega_1$ to $\omega_N$ to down-convert the desired subcarrier signal to base-band. The IQ mixers 812, 814 each output high bandwidth analog signals to the low pass filters 810. The operations of the IQ mixers 812, 814 are discussed in greater detail in reference to FIG. 10.

The low pass filters 810 receive the high bandwidth analog signals. The low pass filters 810 each filter the high bandwidth analog signals to retain the desired subcarrier signal at base-band, and reject all other high frequency subcarrier signals. The A/D converters 816, 818, with proper sampling rate and bandwidth, sample the single subcarrier signal and convert the analog signals to the digital domain for DSP processing. The single carrier DSPs 820 can each be, for example, a conventional single carrier DSP engine. In some examples, the A/Ds 816, 818 and the single carrier DSPs 820 may be combined in a single mixed signal application specific integrated circuit (ASIC).

The single carrier DSPs 820 receive the inphase signals and quadrature signals for X and Y polarizations. The single carrier DSPs 820 produce output data D1 to DN. For example, the single carrier DSP 820-1 may receive the inphase signal $XI_1$, $YI_1$, and quadrature signal $XQ_1$, $YQ_1$, and produce output data Dl. The single carrier DSP 820-N may receive the inphase signal $XI_N$, $YI_N$, and quadrature signal $XQ_N$, $YQ_N$, and produce output data DN. The output data D1 to DN can include bit stream or byte stream, for example, which was transmitted over the transmission channel 120. In some implementations, the output data D1 to DN is different from one another. For example, the output data D1 may be a different set of data compared to the input data DN.

Figure 9:
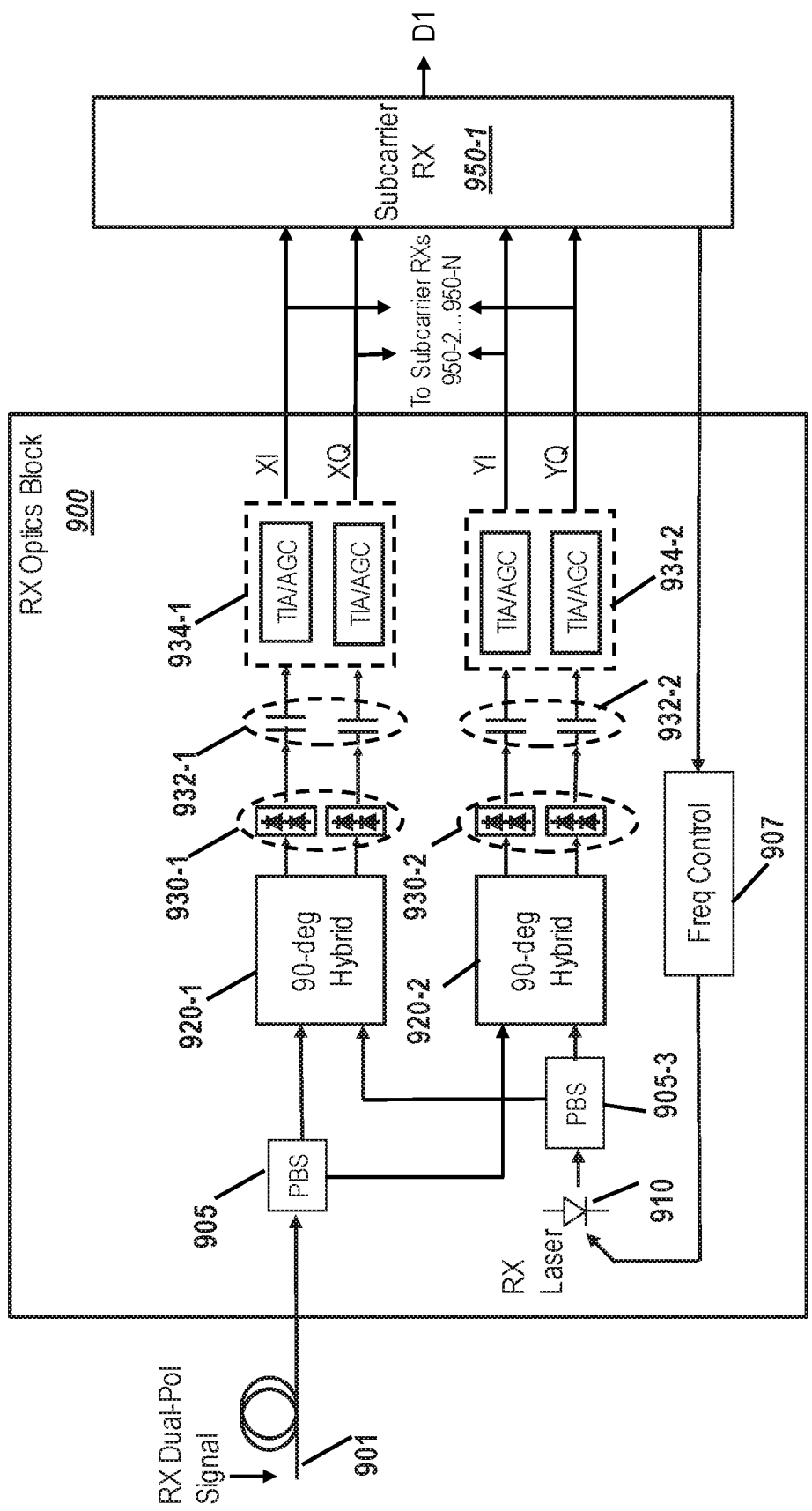
FIG. 9 is a block diagram that illustrates an example receiver optics block.

FIG. 9 is a block diagram that illustrates an example RX optics block, e.g., the RX optics block 900 of FIG. 8. As shown in FIG. 8, optical receiver system 800 includes RX optics block 900, which, in conjunction with subcarrier RXs 950, may carry out coherent detection. RX optics block 900 may include a polarization beam splitter 905, a local oscillator (LO) laser 910, dual-polarization 90 degree optical hybrids or mixers 920-1 and 920-2 (referred to generally as hybrid mixers 920 and individually as hybrid mixer 920), detectors 930-1 and 930-2 (referred to generally as detectors 930 and individually as detector 930, each including either a single photodiode or balanced photodiode), AC coupling capacitors 932-1 and 932-2, and transimpedance amplifiers/automatic gain control circuits TIA/AGC 934-1 and 934-2.

The RX optics block 900 receives the input RX dual-polarization high bandwidth signal 901. The RX optics block 900 can accommodate the high bandwidth signal 901 consisting of the subcarriers SC1 to SCN. The RX optics block 900 includes LO RX laser 910 for beating with the high bandwidth signal 901, and a frequency controller 907 for tuning the frequency of the LO RX laser 910.

In order to demodulate subcarriers SC1 to SCN, LO RX laser 910 may be tuned to output light having a wavelength or frequency relatively close to one or more of the subcarrier wavelengths or frequencies to thereby cause a beating between the LO light and the subcarriers. For example, the LO RX laser 910 may be tuned to the center frequency $\omega_c$ of the high bandwidth signal 901.

In some examples, the LO RX laser 910 may be a semiconductor laser, which may be tuned thermally or through current adjustment. If thermally tuned, the temperature of the LO RX laser 910 is controlled with a thin film heater, for example, provided adjacent the local oscillator laser. Alternatively, the current supplied to the laser may be controlled, if the local oscillator laser is current tuned. The LO RX laser 910 may be a semiconductor laser, such as a distributed feedback laser or a distributed Bragg reflector laser.

Polarization beam splitter (PBS) 905 may include a polarization splitter that receives the polarization multiplexed high bandwidth signal 901 including optical subcarriers SC1 to SCN. The high bandwidth signal 901 may be supplied by an optical fiber link, which may be, for example, an optical fiber segment as part of transmission channel 120 as noted above. PBS 905 may split the incoming modulated optical signal into the two X and Y orthogonal polarization components. Hybrid mixers 920 may combine the X and Y polarization components with light from LO RX laser 910. For example, hybrid mixer 920-1 may combine a first polarization signal (e.g., the component of the incoming modulated optical signal having a first or X (TE) polarization) with light from LO RX laser 910, and hybrid mixer 920-2 may combine the rotated polarization signal (e.g., the component of the incoming modulated optical signal having a second or Y (TM) polarization) with the light from LO RX laser 910.

Detectors 930 may detect mixing products output from the hybrid mixers 920 to form corresponding voltage signals, which are subject to AC coupling by capacitors 932-1 and 932-1, as well as amplification and gain control by TIA/AGCs 934-1 and 934-2. The TIA/AGCs 934-1 and 934-2 provide four lanes of high bandwidth analog signals to the subcarrier RXs 950. For example, the TIA/AGCs 934-1 and 934-2 provide high bandwidth analog signals XI, XQ, YI, and YQ to each of the subcarrier RXs 950-1 to 950-N. Subcarrier RXs 950 may process the digital samples associated with the X and Y polarization components to output data D1 to DN associated with subcarriers SC1 to SCN.

While FIG. 9 shows RX optics block 900 as including a particular quantity and arrangement of components, in some implementations, RX optics block 900 may include additional components, fewer components, different components, or differently arranged components. The quantity of detectors 930 may be selected to implement a RX optics block 900 that is capable of receiving a polarization multiplexed signal. In some instances, one of the components illustrated in FIG. 9 may carry out a function described herein as being carry outed by another one of the components illustrated in FIG. 9.

FIG. 10 is a block diagram that illustrates an example of a system 1000 for RF IQ demodulation. For example, the system 1000 illustrates a more detailed view of the IQ mixers 812-1, 814-1, and the low pass filter 810-1, of FIG. 8. The system 1000 includes four example IQ demodulators 1002, 1004, 1006, 1008. The operations of the IQ demodulators 1002, 1004, 1006, 1008 are representative of the operations of any additional IQ demodulators of additional IQ mixers 812-2 to 812-N and 814-2 to 814-N. For a single polarization, e.g., X polarization or Y polarization, each subcarrier may require two IQ demodulators, for inphase and quadrature paths, respectively. Therefore, four IQ modulators may demodulate both X polarization and Y polarization for a single subcarrier.

The IQ mixer 812-1 includes IQ demodulators 1002, 1004, for demodulating the X polarization component of a high bandwidth signal. The IQ mixer 814-1 includes IQ demodulators 1006, 1008, for demodulating the Y polarization component of the high bandwidth signal. Each IQ mixer 812-1, 814-1 outputs an inphase channel signal and a quadrature channel signal to the low pass filter 810-1.

The IQ demodulators 1002, 1004, 1006, 1008 receive inphase and quadrature signals from the RX optics block 900. In some implementations, the IQ demodulators 1002, 1004, 1006, 1008 receive inphase signals and quadrature signals as analog signals with a continuous range of values. For example, the IQ demodulator 1002 receives the analog signals XI(t) and XQ(t), while the IQ demodulator 1004 receives the analog signals −XQ(t) and XI(t).

The IQ demodulators 1002, 1004, 1006, 1008 mix the inphase and quadrature signals from TIA/AGCs 934-1 and 934-2 with the RF LOs 108 from the frequency synthesizer 104. In some implementations, the IQ demodulators 1002 to 1008 each receives inphase and quadrature signal samples as analog signals with a continuous range of values. The IQ demodulators 1002 to 1008 mix the inphase and quadrature signals with RF $LO_1$, and with a 90-degree shifted version of RF $LO_1$. Each IQ demodulator 1002 to 1008 requires IQ gain, DC offset, IQ delay and quadrature control. The IQ demodulator 1002 outputs a demodulated X polarization inphase channel signal, while the IQ demodulator 1004 outputs a demodulated X polarization quadrature channel signal. The IQ demodulator 1006 outputs a demodulated Y polarization inphase channel signal, and the IQ demodulator 1008 outputs a demodulated Y polarization quadrature channel signal. The IQ mixers 812-1, 814-1 provide the X and Y polarization inphase and quadrature channels signals to the low pass filter 810-1.

The low pass filter retains the desired subcarrier signal at baseband and rejects all other high frequency subcarrier signals. For example, a WDM signal may include a first subcarrier SC1 centered at a frequency of $\omega_c - \omega_1$, and a second subcarrier SC2 centered at a frequency of $\omega_c + \omega_2$. The low pass filter 810-1 receives inphase channel signals and quadrature channel signals for both subcarriers SC1 and SC2. The low pass filter 810-1 demodulates the subcarrier SC1 by isolating and outputting $XI_1$ and $XQ_1$ to the A/Ds 816, 818. The low pass filter 810-1 outputs a value of zero for $XI_2$ and $XQ_2$. Thus, the low pass filter 810-1 filters out the signal for the subcarrier SC2 and any subcarriers of the WDM signal other than SC1.

Embodiments of the disclosure and all of the functional operations described in this specification may be implemented in digital electronic circuitry, or in computer software, firmware, or hardware, including the structures disclosed in this specification and their structural equivalents, or in combinations of one or more of them. Embodiments of the disclosure may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the disclosure may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the disclosure may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the disclosure, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
a first digital signal processor operable to receive first input data and supply a first plurality of inphase signals and a first plurality of quadrature signals, collectively, the first plurality of inphase signals and the first plurality of quadrature signals being a first plurality of IQ signals;
a second digital processor operable to receive second input data and supply a second plurality of inphase signals and a second plurality of quadrature signals, collectively, the second plurality of inphase signals and the second plurality of quadrature signals being a second plurality of IQ signals;
a first plurality of inphase-quadrature (IQ) modulators, including first, second, third, and fourth IQ modulators, wherein the first IQ modulator and the third IQ modulator receive first selected IQ signals of the first plurality of IQ signals, and the second IQ modulator and the fourth IQ modulator receive first selected IQ signals of the second plurality of IQ signals;
a first adder to provide a first sum, the first sum being a sum of outputs of the first IQ modulator and the second IQ modulator;
a second adder operable to add outputs of the third IQ modulator and the fourth IQ modulator to provide a second sum;
a second plurality of inphase-quadrature (IQ) modulators, including fifth, sixth, seventh, and eighth IQ modulators, wherein the fifth IQ modulator and the seventh IQ modulator receive second selected IQ signals of the first plurality of IQ signals, and the sixth IQ modulator and the eighth IQ modulator receive second selected IQ signals of the second plurality of IQ signals;
a third adder to provide a third sum, the third sum being a sum of outputs of the fifth IQ modulator and the sixth IQ modulator;
a fourth adder operable to add outputs of the seventh IQ modulator and the eighth IQ modulator to provide a fourth sum;
a modulator circuit configured to receive a carrier optical signal, the carrier optical signal being operable to receive the first, second, third and fourth sums, such that:
an X polarization of a modulated optical signal output from the modulator circuit includes:
a modulated inphase component based on the first sum associated with the first and second IQ modulators, and
a modulated quadrature component based on the second sum associated with the third and fourth IQ modulators, and a Y polarization of the modulated optical signal includes:
a modulated inphase component based on the third sum associated with the fifth and sixth IQ modulators, and
a modulated quadrature component based on the fourth sum associated with the seventh and eighth IQ modulators, wherein:
the modulated optical signal is centered at frequency $\omega c$;
the modulated optical signal comprises a plurality of subcarriers; and
a center frequency of each of the plurality of subcarriers is offset from $\omega c$ by a frequency of said one of the plurality of local oscillator signals.

2. The system of claim 1, wherein the plurality of subcarriers forms a continuous waveform in the frequency domain.

3. The system of claim 1, wherein the modulated optical signal further comprises a plurality of gaps between subcarriers in the frequency domain.

4. The system of claim 3, wherein the frequency width of each of the plurality of gaps is equal.

5. The system of claim 3, wherein the frequency width of each of the plurality of gaps is variable.

6. The system of claim 3, wherein each of the plurality of gaps separates a group of subcarriers comprising one or more subcarriers.

7. The system of claim 6, wherein each of the one or more subcarriers within each group of subcarriers transmits a same route through an optical network.

8. The system of claim 1, further comprising a frequency synthesizer for determining the center frequency of each of the plurality of subcarriers.

9. The system of claim 1, wherein the center frequencies of the plurality of subcarriers are symmetrical about $\omega c$.

10. The system of claim 1, wherein a maximum number of subcarriers is defined by a bandwidth of the modulator circuit.

11. The system of claim 1, wherein each of the plurality of subcarriers is a Nyquist subcarrier.

12. The system of claim 1, wherein each of plurality of subcarriers is modulated in accordance with a modulation format, the modulation format being selected from an m-quadrature amplitude modulation (QAM), m being an integer, quadrature phase shift keying (QPSK), and binary phase shift keying (BPSK).

* * * * *